Aug. 7, 1951 N. DRISCH ET AL 2,563,644
DIALYTIC MEMBRANE AND METHOD OF PRODUCING SAME
Filed June 29, 1949 2 Sheets-Sheet 1
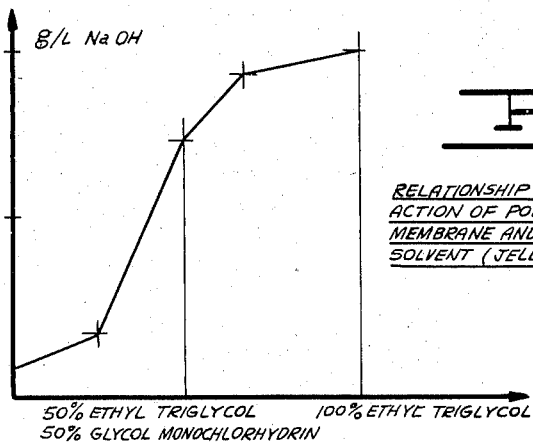
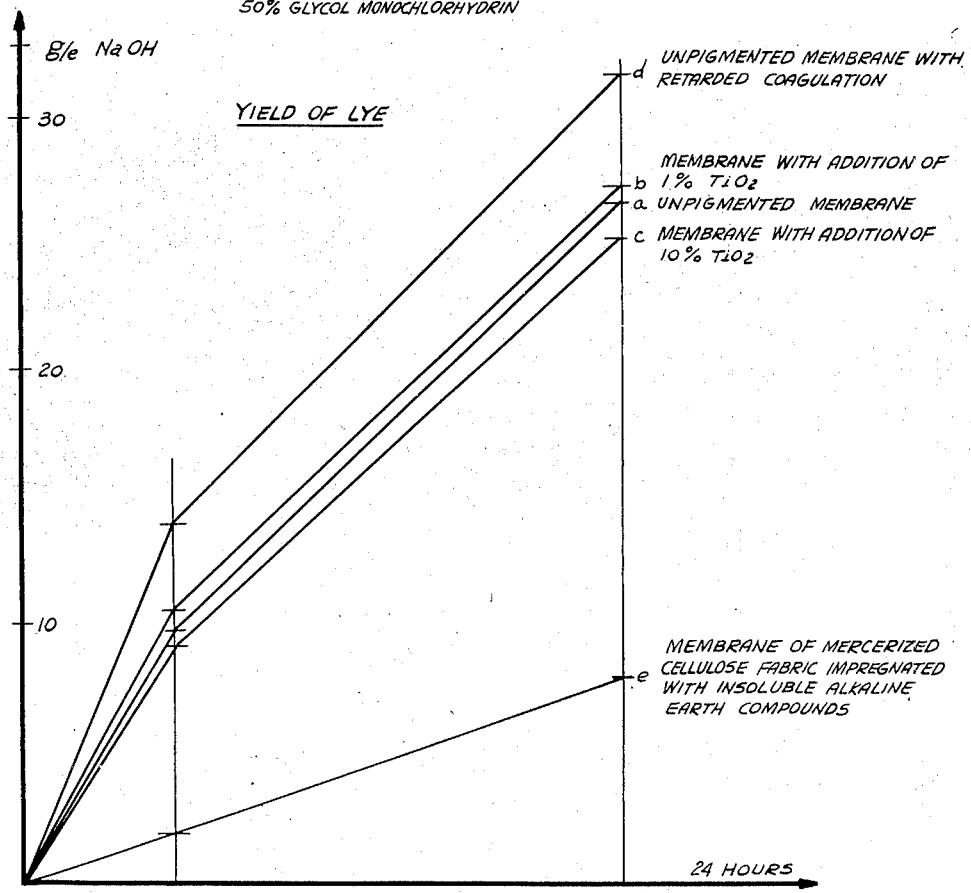
INVENTORS
NICOLAS DRISCH
BY PAUL HERRBACH
ATTORNEY

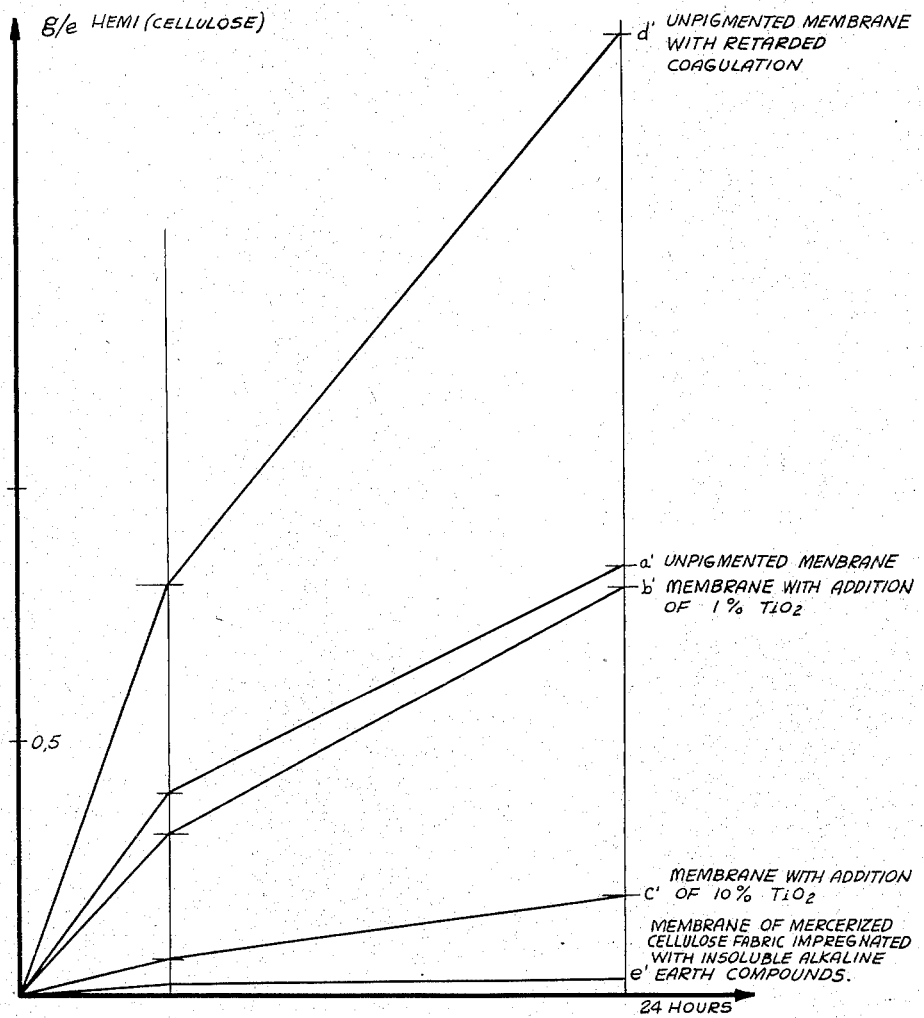

Patented Aug. 7, 1951

2,563,644

UNITED STATES PATENT OFFICE 2,563,644

DIALYTIC MEMBRANE AND METHOD OF PRODUCING SAME

Nicolas Drisch and Paul Herrbach, Paris, France, assignors to Comptoir des Textiles Artificiels, a corporation of France Application June 29, 1949, Serial No. 101,928
In France July 26, 1948

6 Claims. (Cl. 18—57)

This invention relates to dialytic membranes and has for an object to provide a membrane having high permeability to crystalloids, low permeability for colloids, and relatively great mechanical strength.

Some materials heretofore employed industrially are dialytic membranes, vegetable parchment, films of regenerated cellulose, nitrocellulose, artificial resins, etc., fabrics specially treated with distention agents and salts, and fabrics prepared by treatment with solutions forming films. It is necessary that the membrane be in no way attacked by the solution to be dialyzed, nor by the liquid on the other side of the membrane. In addition, it is desired to combine a pronounced permeability to crystalloids with a minimum rate of dialysis with respect to the colloids accompanying these crystalloids in the liquid to be dialyzed. Besides, the membranes must be of adequate mechanical strength, thus reducing the risk of tearing and pinching at the points of attachment in the dialyzer, and the danger of rupture during use under the effect of hydrostatic pressure. The greater the strength of the membranes, the longer the period of time over which their use can be continued.

The invention provides, as novel industrial products, new dialytic membranes having the above mentioned characteristics.

These membranes are chiefly characterized in that they have a base of polyvinyl resins, and in particular a base of polyvinyl formals.

The said membranes conform in a high degree to the specifications enumerated above, and may be employed for a great variety of dialytic processes, and more particularly for the dialysis of aqueous solutions of electrolytes contaminated with colloidal impurities. One major application consists in the regeneration of lyes after use for mercerizing cellulose, such lyes containing hemicellulose, but numerous other applications are possible, for example: recovery of lyes used in the preparation of cellulose pulps; dialysis of viscose with a view to reducing the alkali content; dialysis of molasses with a view to recovery of residual sugar; purification of blood serum and other biological liquids; and purification of cellulose esters, as sodium cellulose glycolate.

Dialysis may be performed upon aqueous solutions, and also upon other solutions, provided only that the liquid medium is practically without action on the membrane.

The invention primarily contemplates the use as dialytic membranes of polyvinyl films obtained by the solution of polyvinyl derivatives in hot solvents miscible with water and yielding solutions which solidify into a jelly upon cooling. Suitable solvents are the ethers of polyethylene glycol, such as the ethyl ethers of di- or triethylene glycol.

It is not possible to use thin films of all artificial resins, or even all films of polyvinyl formals as membranes for dialysis. For example, films of polyvinyl formals obtained by drying in a thin coating of solutions of formals do not constitute satisfactory dialytic membranes as they have only a low permeability to crystalloids.

Still another feature of the present invention is the increase of the separative effect of the membranes described above by the addition of definite quantities of very finely divided inert pigments to the solutions employed for their preparation, in particular of traces of titanium oxide of an average grain size of about 1 $\mu$. Up to 15% of pigment may be added, but preferably 5% is added, calculated upon the weight of the dissolved resin. This quantity of pigment scarcely affects the rate of dialysis of the crystalloids, but substantially reduces the rate of dialysis of the colloids. The effect of the pigment is attributed to a partial filling of the intermicellular pores, thus accentuating the "screening" effect.

The films of jelly obtained upon cooling are subjected to a thorough washing with water before use. No drying may be applied, but displacement of the water of distention by inert solvents miscible with water is possible. The membranes must in all cases be kept either in water or in the liquid with which the water has been displaced. Traces of antiseptics may be added to the liquid, as for example minute traces of formaldehyde.

Films may be used either without supports or with suitable impregnated, coated or the like support such as paper, fabric, etc. The support is treated with the hot resin solution, then chilled for jellification of the solution and thoroughly washed.

The membranes may be in the form of sheets, tubing, sacks, etc. Their size is determined by the dialyzers to be used, whether frame, plate, sack, etc.

In the accompanying drawings Figs. 1 to 3 are graphs illustrating the invention. It is to be understood that these examples, as well as the numeral values of the graphs, are in on way restrictive, and that the invention extends as well to other embodiments of which several examples have already been given. Thus, it may be pointed out that while the invention is disclosed specifically in terms of the dialysis of mercerizing lyes, this is merely an exemplifying instance not affecting the more general scope of the invention. For example, a considerable improvement in dialytic effect may be obtained in the case of films of polyvinyl formals by retarding coagulation, namely through slower cooling.

Fig. 1 of the accompanying drawings shows the relative quantity of soda dialyzed through a membrane composed of a film of a commercial polyvinyl formal sold under the name of "Rhovinal FM" and obtained from solutions in mixtures of glycol monochlorhydrin and ethyl ether of triethylene glycol, containing increasing quantities of the latter. The ethyl ether of triethylene glycol is a hot solvent forming solutions which solidify to jelly when cool, while the monochlorhydrin is both a hot and a cold solvent.

The graph shows the quantities of NaOH in grams per liter (g/L) plotted as ordinates and the percentages (%) of ethyl triglycol relative to glycol monochlorhydrin as abscissas. At $m$ the mixture contains 50% of each substance, and at $n$ 100% of ethyl triglycol. We see that monochlorhydrin solutions, namely those containing only small proportions of ethyl ether of triethylene glycol, do not yield membranes of value for dialysis. As the proportion of ethyl ether of triethylene glycol increases, the dialytic effect increases rapidly in a linear ratio to that proportion, and then levels off to a limit which is practically reached at 80% ether.

The ethers of diethylene glycol yield better results than the ethers of triethylene glycol with respect to permeability to hemicellulose, without affecting the yield of lye.

Fig. 2 shows comparative dialytic action of various membranes of polyvinyl formals manufactured by cold jellification of suitable hot solutions, with one membrane manufactured by heavy mercerizing of cellulose fabrics and weighting with insoluble alkaline earth compounds.

For the three polyvinyl membranes, 15% solutions of "Rhovinal FM" polyvinyl formal in the ethyl ether of triethylene glycol were used. Curve $a$ shows the increase in lye content $t$ (ordinates) in the dialysis as a function of time $h$ (abscissas) in hours for a membrane obtained from an unpigmented solution, curve $b$ the same for a solution containing 1% of $TiO_2$, and curve $c$ the same for a solution containing 10% of $TiO_2$.

Curve $d$ corresponds to a film obtained by retarded coagulation. Curve $e$ corresponds to the control membrane of mercerized cellulose fabric impregnated with insoluble alkaline earth compounds. First we may note a considerable superiority of the three polyvinyl formal membranes over the fabric membranes, the rate of dialysis being from three to four times higher. Moreover, the addition of 1% of $TiO_2$ to the solution scarcely affects the rate of dialysis of the lye. An addition of 10% occasions a slight drop.

Fig. 3 shows curves $a'$, $b'$, $c'$, $d'$, $e'$, as before, for hemicellulose passing through the membrane with the lye. Periods of time $h$ in hours are plotted as abscissas, and hemicellulose contents $t'$, as ordinates.

It will be noted by comparison of curves $a'$ and $b'$ that the incorporation of 1% of titanium oxide practically does not affect the dialysis of the lye, whereas the passage of the hemicellulose is retarded.

Moreover, the membranes of polyvinyl formals will yield the same dialytic results within a far shorter time than the membranes of curve $e$, though at the expense of a slightly but by no means excessively increased passage of hemicellulose. At the same time, the advantage of far more rapid dialysis manifests itself in the employment of a several-times smaller number of dialysers for treating a given quantity of liquid. The superior mechanical properties of the membranes of polyvinyl formals further result in a reduced consumption of membranes.

To supplement the information previously given concerning the preparation of membranes, one complete example will be given of the manufacture of an impregnated sack:

*Example*

A sack of cotton on a hollow mold containing water at 15° C. is dipped in a 15% solution of "Rhovinal FM" in ethyl ether of diethylene glycol heated to 90° C. The mold is withdrawn from the liquid and slowly cooled by internal circulation of water at 15° C. The film begins to jellify as soon as the mold is removed from the liquid. It is then washed for one hour on the mold with running water, whereupon the sack is removed from the mold. It is then ready for use.

What is claimed is:

1. The method of producing dialytic membranes which comprises gelling at low temperature a thin layer of a polyvinyl acetal from a solution thereof in a high boiling solvent in which the polyvinyl acetal is soluble only at elevated temperatures and consisting essentially of a mixture of glycol monochlorhydrin and a water soluble ether of a polyethylene glycol containing at least 80% of said ether, washing said membrane with water and preserving in the wet state until ultimate use.

2. The method of producing dialytic membranes which comprises gelling at low temperature a thin layer of a polyvinyl formal from a solution thereof in a high boiling solvent in which the polyvinyl formal is soluble only at elevated temperatures and consisting essentially of a mixture of glycol monochlorhydrin and a water soluble ether of a polyethylene glycol containing at least 80% of said ether, washing said membrane with water and preserving in the wet state until ultimate use.

3. A water moist dialytic membrane produced by the gelling at low temperature of a thin layer of a polyvinyl acetal from a solution thereof in a high boiling solvent in which the polyvinyl acetal is soluble only at elevated temperatures and consisting essentially of a mixture of glycol monochlorhydrin and a water soluble ether of a polyethylene glycol containing at least 80% of said ether, washing said membrane with water and preserving in the wet state until ultimate use.

4. A water moist dialytic membrane produced by the gelling at low temperature of a thin layer of a polyvinyl formal from a solution thereof in a high boiling solvent in which the polyvinyl formal is soluble only at elevated temperatures and consisting essentially of a mixture of glycol monochlorhydrin and a water soluble ether of a polyethylene glycol containing at least 80% of said ether, washing said membrane with water and preserving in the wet state until ultimate use.

5. A water moist dialytic membrane, as set forth in claim 3, containing from 1% to 5% titanium oxide.

6. A water moist dialytic membrane, as set forth in claim 4, containing from 1% to 5% titanium oxide.

NICOLAS DRISCH.
PAUL HERRBACH.

REFERENCES CITED

The following references are of record in the file of this patent:

UNITED STATES PATENTS

| Number | Name | Date |
|---|---|---|
| 2,046,378 | Haux | July 7, 1936 |
| 2,056,796 | Macht | Oct. 6, 1936 |
| 2,077,298 | Zelger | Apr. 13, 1937 |
| 2,148,062 | Esselen et al. | Feb. 21, 1939 |
| 2,338,787 | Ushakoff | Jan. 11, 1944 |

FOREIGN PATENTS

| Number | Country | Date |
|---|---|---|
| 843,823 | France | May 10, 1941 |